May 16, 1967  H. BLOOMFIELD ETAL  3,319,561
AUTOMATIC COFFEE BREWER
Filed Dec. 16, 1963  4 Sheets-Sheet 3
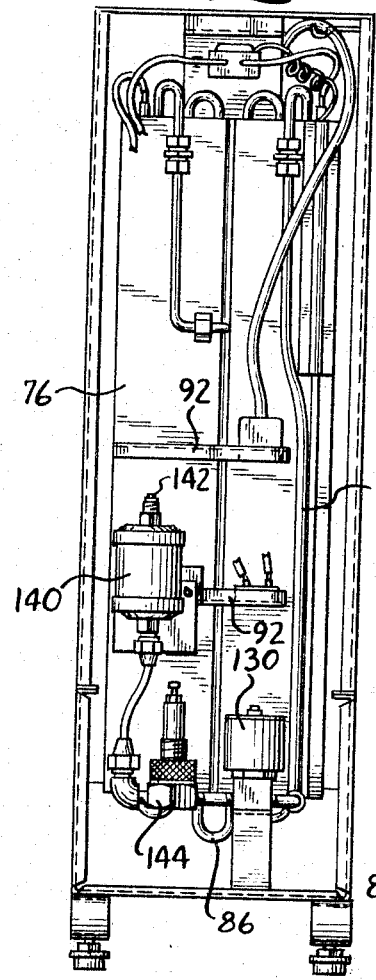
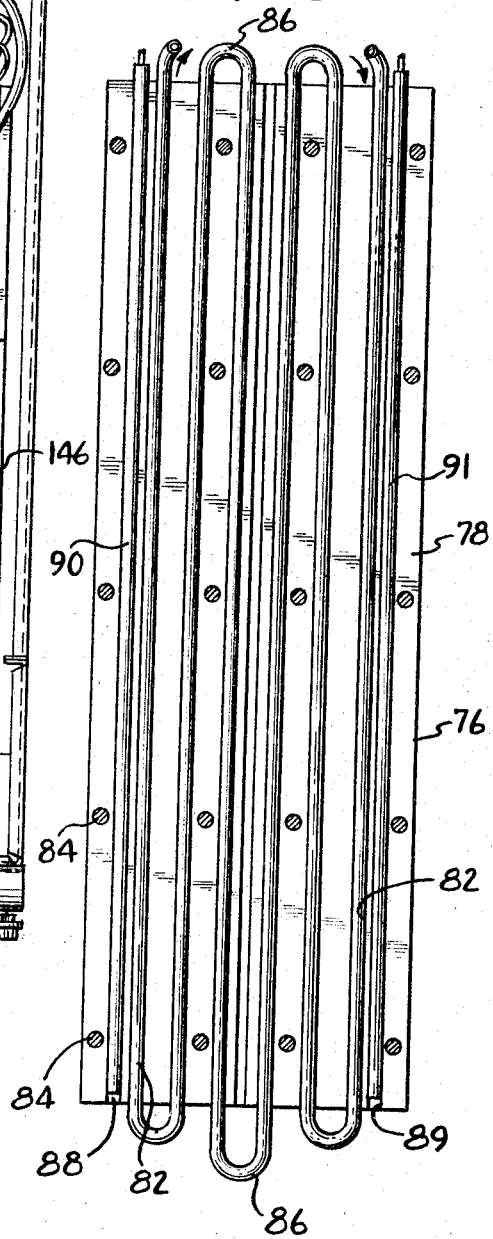
INVENTORS
HAROLD BLOOMFIELD
AUGUST C. PURPURA
by: *[signature]*
ATTY.

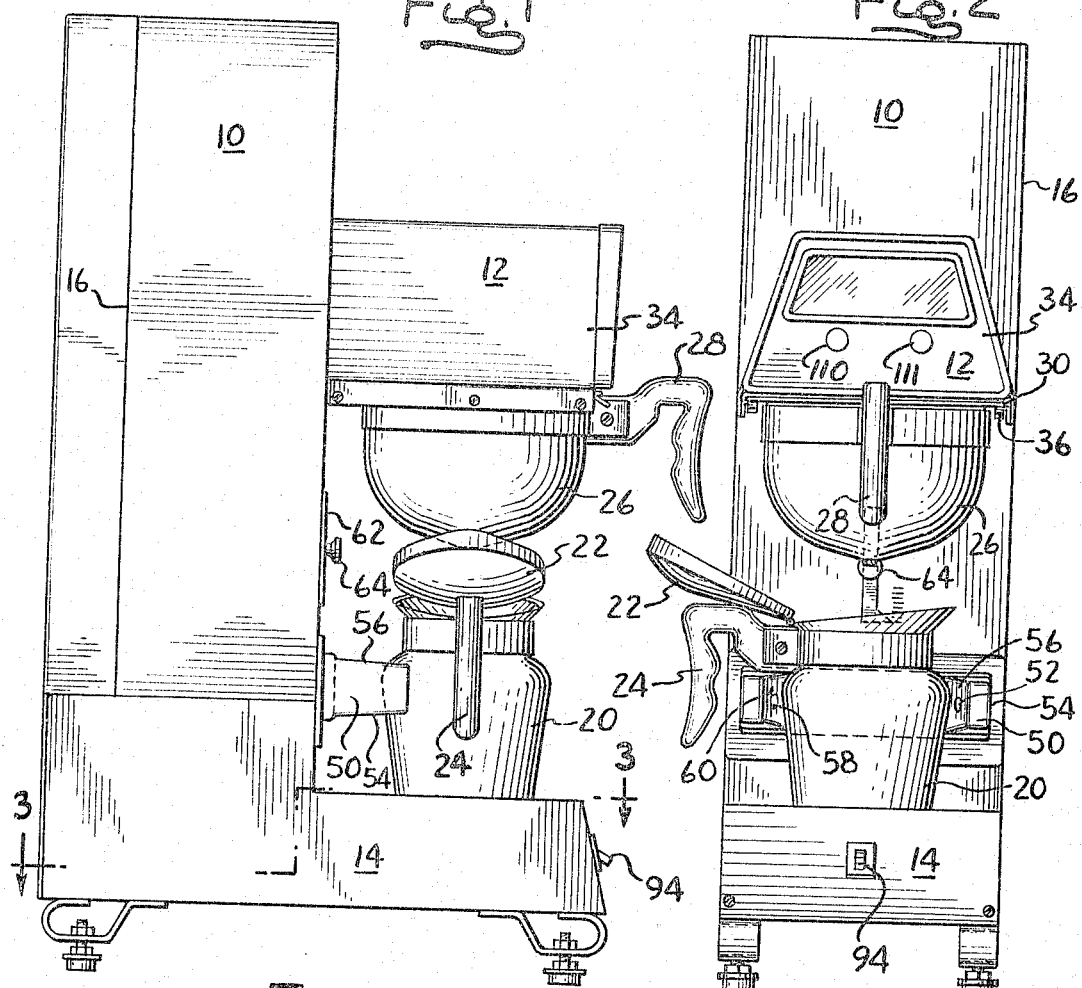
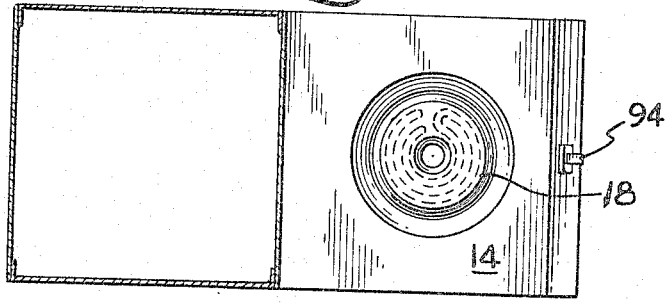

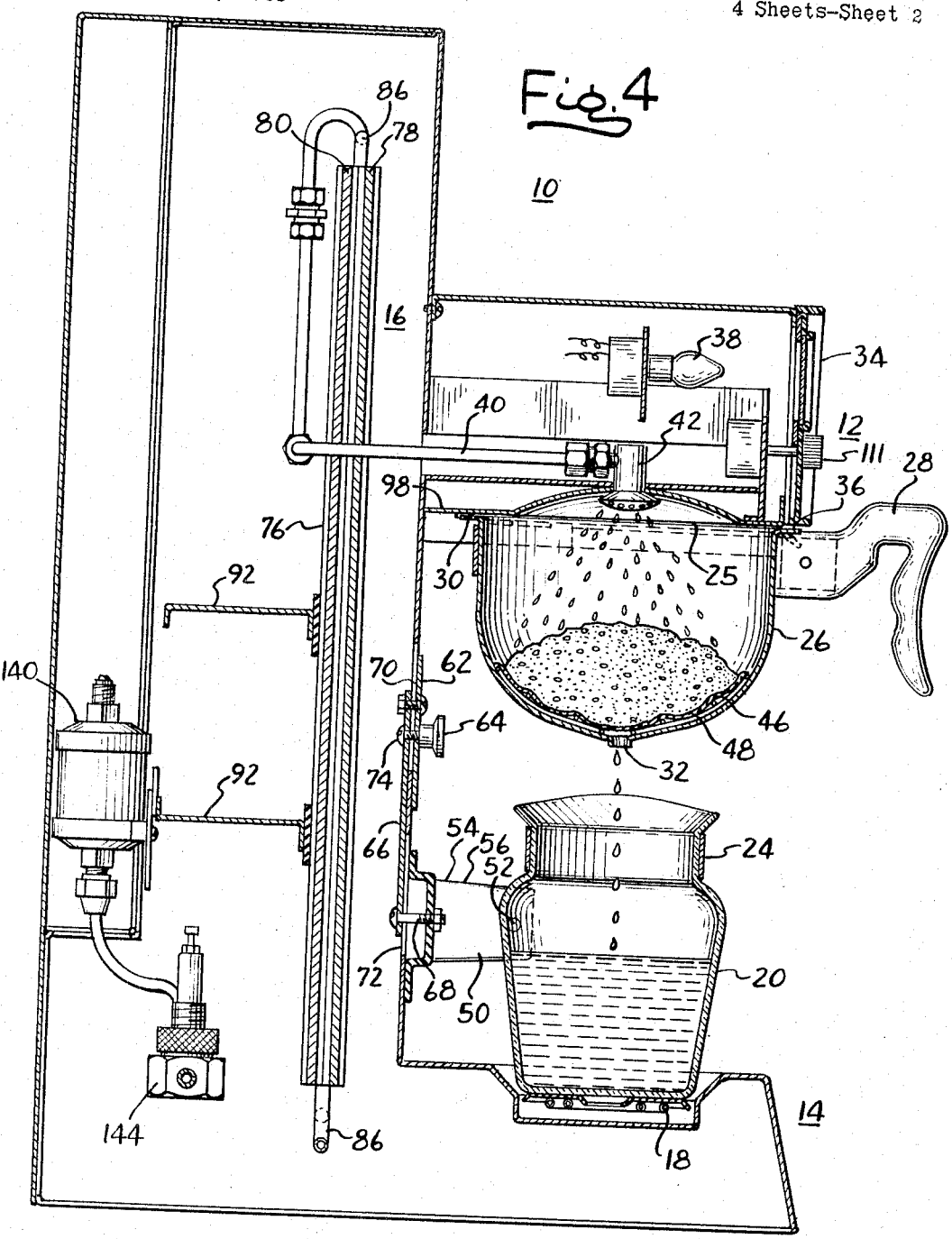

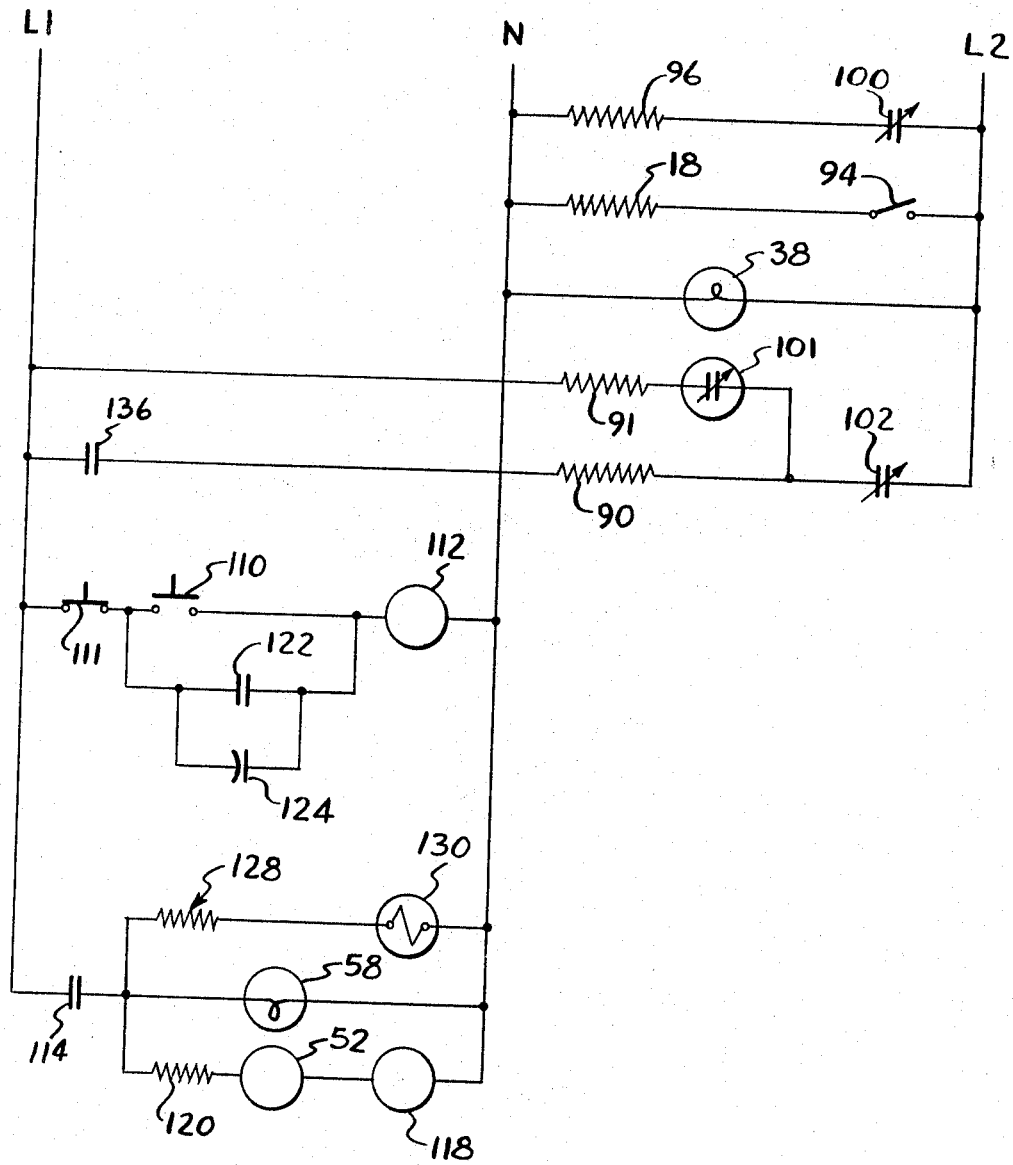

United States Patent Office 3,319,561
Patented May 16, 1967

3,319,561
AUTOMATIC COFFEE BREWER
Harold Bloomfield, Glencoe, and August C. Purpura, Melrose Park, Ill., assignors to Bloomfield Industries, Inc., Chicago, Ill., a corporation of Delaware
Filed Dec. 16, 1963, Ser. No. 330,818
9 Claims. (Cl. 99—283)

This invention relates to an automatic coffee making machine and, in particular, to an automatic coffee making machine having a continuous flow type heat exchanger.

The art of coffee making requires precise measurements of the coffee used, the water temperature, and the length of time that the water is in contact with the coffee grounds. In normal brewing methods, these variables are approximated with the result that various batches of brewed coffee are not uniform. In the brewing of coffee for commercial establishments, for example, extensive equipment is needed such as, for example, a water heater, a sink, a brewing tank, etc., all of this equipment utilizes needed and required space.

In accordance with the above an automatic coffee making machine is provided that utilizes a continuous flow type heat exchanger that permits precise control over the temperature and the flow rate of heated water. Also the heat exchanger requires little space inasmuch as comparatively little water is stored therein.

The general object of this invention is to provide an automatic coffee making machine.

A more specific object of this invention is to provide an automatic coffee machine that provides an improved cup of coffee, due to the regulation of the water temperature, and the flow rate of the water.

Another object of this invention is to provide an automatic coffee making machine that requires very little maintenance, is easy to set up, and which employs disposable filters therein.

It is another object of this invention to provide an automatic coffee making machine that utilizes a comparatively small amount of space and has easily replaceable parts.

It is another object of this invention to provide a continuous flow type heat exchange unit for an automatic coffee making machine.

It is yet another object of this invention to provide a continuous flow type heat exchange unit that resists the accumulation of scale therein and wherein the parts thereof are expected to periodically need replacement are readily replaceable.

Briefly, the disclosed preferred embodiment of the invention comprises an automatic coffee maker which employs the gravity drip type brewing method. Coffee grounds are carefully measured and inserted into a brewing pot having a disposable filter positioned therein. The brewing pot is inserted into provided holding means in the automatic coffee making machine, and the machine is activated by operating a switch. Water begins to flow in a few seconds and it passes through a continuous flow type heat exchanger, out through a spray nozzle and into the coffee grounds in the brewing pot. The hot water flows through the coffee grounds and the disposable filter element and through a bottom passage in the brewing pot and down to a coffee dispensing decanter where it is collected. An electric eye is positioned adjacent the coffee dispensing decanter and the beam thereof passes through the transparent coffee dispensing decanter and permits the operation of the machine to continue. As soon as the level of coffee reaches the height of the electric eye beam, the electric eye beam is broken and the machine is automatically turned off. The water remaining in the continuous flow type heat exchanger of the automatic coffee making machine is kept at a predetermined temperature so that it will be available quickly when hte machine is re-cycled. Warmer elements are also provided in the machine to keep the brewed coffee at a desired warm temperature.

Other objects, advantages and features of the invention may be more readily understood if the following is viewed in light of the drawings of which:

FIG. 1 is a side-elevational view of the preferred embodiment of the automatic coffee making machine;

FIG. 2 is a front-elevational view of the coffee making machine illustrated in FIG. 1;

FIG. 3 is a view taken along the line 3—3 in FIG. 1;

FIG. 4 is a cross-sectional view of the coffee making machine illustrated in FIG. 1;

FIG. 5 is a rear-elevational view of the coffee making machine illustrated in FIG. 1 with the back walls removed;

FIG. 6 is an elevational view of the continuous flow type heat exchanger utilized in the coffee making machine illustrated in FIG. 1 and with one of the plates utilized in the heat exchanger removed; and FIG. 7 is an electrical schematic circuit diagram of the automatic coffee making machine illustrated in FIG. 1.

Referring now to the drawings, an automatic coffee making machine is generally indicated as 10. The coffee making machine 10 comprises a brewing section generally indicated as 12, a warming section generally indicated as 14, and a hot water heating section generally indicated as 16. The warming section 14 has an electrical heating element 18 positioned therein and arranged in the electrical circuit as illustrated schematically in FIG. 7. Normally positioned on the electrically heated element 18 is a coffee dispensing decanter 20. The coffee dispensing decanter 20 is adapted to be utilized in the illustrated automatic coffee making machine 10 and is transparent and preferably made of glass and is provided with a cover 22 and a removable handle assembly 24. The particular configuration and details of the cover 22 and the removable handle assembly 24 do not form a part of this invention. It may be of any construction now available on the market. The electrical heating element 18 is designed to keep the coffee in the coffee dispensing decanter 20 at a desired warm temperature before serving.

The brewing section 12 comprises a stainless steel removable brewing pot 26 having attached thereto a handle structure 28. Positioned on the brewing pot 26 is an upper flanged lip 30 extending around the upper edge of the brewing pot 26. The brewing pot 26 is provided with a large upper opening 25 and a smaller bottom opening 32.

The brewing section 12 also comprises an upper housing 34 adapted to support the brewing pot 26 and to removably retain the brewing pot 26 in the position as illustrated in the drawings and especially FIGS. 1, 2 and 4. The upper housing 34 is provided with a pair of rails 36 positioned on each side of the upper housing 34. The rails 36 are readily formed in the bottom of the upper housing 34 and are essentially U-shaped. The pair of rails 36 face one another and this enables the upper flange lip 30 of the brewing pot 26 to be readily placed in the pair of rails 36 and can therefore be slid along and supported by the pair of rails 36 and readily removed from and inserted into the upper housing 34 of the brewing section 12. The brewing section 12 also includes an indicating lamp 38 which indicates that the automatic coffee making machine has been energized.

Also positioned in the brewing section 12 is a vapor-heating element (not shown) but schematically indicated as 96 in FIG. 7, that is positioned in contact with the lower plate 98 of the brewing section 12. The vapor-heating element 96 heats the plate 98 to prevent the condensation of water on the lower plate 98 and the temperature of the plate 98 is controlled as will be seen.

The hot water line 40 (FIG. 4) carries hot water at a predetermined temperature from the hot water heating section 16, as will be seen, and the hot water is transmitted through the hot water line 40 to a spray-type nozzle 42. Before the brewing pot 26 is inserted into the brewing section 12 a wire mesh holding structure 46 is positioned within the brewing pot 26 to space the filter and the coffee grounds from the bottom of the brewing pot 26. Also positioned in the brewing pot 26 is a replaceable paper filter element 48. Received within the filter 48 are the coffee grounds.

Water coming from the hot water line 40 proceeds through the spray type nozzle 42 where it is evenly dispensed onto the coffee grounds and while passing through the coffee grounds, absorbs the desired ingredients in the coffee grounds and then passes through the filter 48 and drips out of the smaller opening 32 into the coffee dispensing decanter 20.

An electric eye assembly 50 is provided to automatically control the amount of coffee that is dispensed into the coffee dispensing decanter 20. The electric eye assembly 50 comprises a photocell 52 positioned on the extended arm 56 of the electric eye assembly bracket 54, as seen in FIG. 2 and is aligned with a light source 58 positioned on the other extended arm 60 of the electric eye assembly bracket 54. Light from the light source 58 passes through the transparent coffee dispensing decanter 20 and onto its aligned photocell 52. When this beam is interrupted, the machine 10 is switched off and this occurs when the coffee in the coffee dispensing decanter reaches a predetermined height as determined by the positioning of the electric eye assembly 50. The electric eye assembly 50 is mounted so that its height may be adjusted to facilitate the use of decanters of different sizes and shapes.

As best shown in FIG. 4 the electric eye assembly 50 includes a sliding plate 62, a knob 64 positioned adjacent said sliding plate 62, a back plate 66 positioned behind the front wall of the machine 10, a screw and nut assembly 68 connecting the electric eye assembly bracket 54 to the back plate 66 and an upper slot 70 and a lower slot 72 provided in the front wall of the machine 10. The knob 64 is threadedly engageable with a locking screw 74 and can be moved in or out on the locking screw 74, thus pressing the sliding plate 62 with more or less force against the front end of the machine, to enable the electric eye assembly 50 to be moved up and down in the upper slot 70 and the lower slot 72, as can readily be understood.

Before the operation of the coffee making machine 10 will be described attention is directed to the hot water heating section 16 and reference is more specifically had to FIGS. 4, 5 and 6 in which is illustrated a continuous flow type heat exchanger generally indicated at 76. The continuous flow type heat exchanger 76 is comprised of two mirror-image plates 78, 80 which are composed of a good heat conducting material such as aluminum for example, and preferably extruded aluminum. The mirror-image plates 78, 80 are provided with a plurality of slots 82 that are semi-circular in cross-section and when the mirror-image plates 78, 80 are positioned in a face-to-face relationship, they form cylindrical slots or passageways extending through the continuous flow-type heat exchanger 76. The mirror-image plates are maintained in face-to-face relationship by a plurality of bolts 84, as can be best seen in FIG. 6.

Positioned in the slots 82 in the continuous flow type heat exchange 76 is a serpentine shaped copper water line 86 provided to guide water traveling through the continuous water line 86 to pass up and down through the continuous flow-type heat exchanger 76 before emerging therefrom to flow through the hot water line 40, as best seen in FIGS. 4, 5 and 6. A pair of slots 88 and 89 are also positioned in each of the mirror-image plates 78, 80 and said slots 88 and 89 have the heating elements 90 and 91 positioned therein. The heating elements 90 and 91 are electrical heating elements which are designed to transfer a large amount of energy to the mirror-image plates 78, 80 and consequently to the water line 86 and then to the water passing through the water line 86 so as to provide a structure for quickly heating water continuously flowing through the heat exchanger 76.

After the mirror-image plates 78, 80 are bolted together with the water line 86 and heating elements 90 and 91 positioned therein, the heat exchanger 76 can be easily mounted in the hot water heating section 16 by means of mounting brackets 92 such as those shown in FIG. 4 although no special type of mounting bracket is required.

OPERATION

Reference is now had to FIG. 7 in conjunction with the other figures of the drawings. FIG. 7 is a schematic electrical diagram illustrating the system embodied in the drawings illustrated in FIGS. 1 through 6. A three wire single phase power pattern is utilized in FIG. 7 with approximately 230 v. A.C. between lines L1 and L2 and approximately 115 v. A.C. from either line L1 or L2 to line N. As soon as the automatic coffee making machine 10 is plugged into the provided electrical line, the lamp 38 is energized, indicating that the automatic coffee making machine 10 is connected to a source of electrical energy. The electrical heating element 18 which is positioned in the warming section 14 of the machine 10 is in series with a warming switch 94. The warming switch 94 is positioned in front of the warming section 14, as can be readily seen in the drawings and, is normally open. After the coffee brewing begins the warming switch 94 is energized, thereby energizing the electrical heating element 18 to keep the brewed coffee in a warmed condition. A vapor-heating element 96 is positioned contiguous with the lower plate 98 of the brewing section 12 and is in series with a bi-metal thermostat 100 of any known type and together maintain the temperature of the lower plate 98 at approximately 200° F. The lower plate 98 is so heated so as to prevent the condensation of water thereon. The lower plate 98 is heated as soon as the machine 10 is connected to a source of electrical energy.

The heating elements 90 and 91 which are positioned in slots 88 and 89, respectively, as best seen in FIG. 6 are connected across the 230 volt line, L1, L2. The heating element 90 is connected in series with an overheat thermostat 102, of any suitable type that is positioned in contact with the continuous flow type heat exchanger 76, and contacts 136 of the first control relay 112 which are normally open. In a preferred embodiment of the invention, the thermostat 102 is set to have its contacts open at a temperature of 325° F. In other words, if the temperature of the plates 78, 80 would ever reach 325° F. the thermostat 102 will open its contacts and cut off energy from being supplied to the heating element 90.

Heating element 91 is positioned in series with thermostat 101 as well as thermostat 102 and thermostat 101 is set to have its contacts open at a temperaure of 200° F. The thermostat 101 can also be of any suitable type and should be positioned so as to sense the temperature of the plates 78, 80.

It has been observed that placing the heating elements 90 and 91 in the slots 88 and 89 has provided the best heat transfer and appears to be the most desirable arrangement.

The heating element 91 as stated is positioned in slot 89 and is adjacent the inlet portion of the water line 86 at a point where the greatest heat transfer occurs. This is true because here the greatest temperature differential occurs. The thermostat 102 is not expected to open as it functions as a safety precaution and would only open if thermostat 101 remained closed for some reason. Thermostat 101 will therefore do the normal temperature controlling and will open and close in a quick manner in response to the change in the temperature of the plates 78, 80 which will correspond to any change in the water temperature.

In the preferred embodiment of the invention the thermostat 101 is positioned so as to be responsive to the temperature of the mirror image plates adjacent the inlet slot 89.

The cycle is begun by removing the brewing pot 26 from the machine 10 by sliding it outwardly along the pair of rails 36. Next a filter 48 is placed over the wire mesh member 46 and the coffee grounds are placed on top of the filter. The brewing pot 26 is then positioned back in the machine 10.

Next, a start switch 110 diagrammatically illustrated in FIG. 7 is actuated. The start switch 110 is in series with a stop switch 111 that is normally closed and the start switch 110 is normally open. When the start switch 110 is initially operated the circuit from one side of the 230 volt line to the neutral side for the control relay 112 is closed. When the first control relay 112 energizes, its contacts 114 close, energizing the light source 58 of the electric eye assembly 50. Energy from the light source 58 decreases the internal resistance of the photocell 52, thus enabling the second control relay 118 to be energized from one side of the 230 volt line through the contacts 114 of the first control relay 112 through a voltage divider resistor 120, the photocell 52 and through the coil of the second control relay 118 to neutral. The energization of the second control relay 118 closes the contacts 122 of the second control relay 118, thus providing a lock-in circuit for the first control relay 112, as can be clearly seen in the drawings. A capacitor 124 is provided across the contacts 122 of the second control relay 118 to reduce the effect of any arcing.

Also provided is a thermistor 128 positioned in series with a solenoid valve 130 and the contacts 114 of the first control relay 112. The thermistor 128 has the property of decreasing in resistance with an increase in its temperature and functions as a time-delay in energizing the solenoid valve 130. The solenoid valve 130 controls the water inlet and when the solenoid valve 130 is opened or energized, water flows through the continuous flow type heat exchanger 76.

When the coffee level in the coffee dispensing decanter 20 rises high enough to break the beam between the photocell 52 and the light source 58 of the electric eye assembly 50 the internal resistance of the photocell increases, thereby decreasing the voltage across the coil of the second control relay 118, thereby de-energizing the second control relay 118 and opening the contacts 122 of the second control relay 118 to thereby open the circuit to the coil of the first control relay 112 to thereby open the contacts 114 of the first control relay 112 to de-energize the solenoid valve 130 to cut off the flow of water into the continuous flow-type heat exchanger 76. Also, the machine 10 can be turned off at any time, by merely activating the stop button 111, and this will open the circuit to the first control relay 112 and subsequently to the second control relay 118, to thereby cut off the water flowing through the water line 86 and heat exchanger 76.

Referring now to FIGS. 4, 5 and 6, as well as FIG. 7, the water supply is connected to a water filter 140 at the inlet end 142 thereof, as indicated in FIG. 5. The water travels through the water filter 140 and into a manually adjustable pressure reducer control valve 144. Control valve 144 can be set to provide various flow rates of water through the machine 10. In one particular embodiment of the invention it is contemplated that twenty-seven ounces of water per minute will pass through the coffee maker 10. The water proceeds to the solenoid valve 130 which is controlled as has been previously explained and, from there through an inlet water line 146 up to its connection with the water line 86, which defines the serpentine path through the continuous flow-type heat exchanger 76, and from there the water flows through the previously mentioned hot water line 40 to the spray-type nozzle 42 and onto the coffee grounds. The tubing used in the automatic coffee maker 10 which has water flowing therethrough is preferably made of copper and it has been found that no slate or lime accumulates in the tubing as does occur in prior art boilers. It is believed that the slate or lime does not accumulate due to the continuous flow of the water through the same path, which washes out any slate tending to accumulate.

In the continuous flow-type heat exchanger 76 there is comparatively nothing to wear out; the mirror image plates 78, 80 and the copper water line 86 should not be the subject of periodic maintenance. The only elements expected to be subject to periodic maintenance are the heaters 90, 91 and they can be readily replaced by loosening the bolts 84 connecting the mirror image plates 78, 80 to one another and then slipping out the heater elements 90, 91 and replacing them with new heater elements. This could be done without any disassembling of the continuous flow-type heat exchanger 76.

What has been described is considered the preferred embodiment of the invention, however, many modifications and alterations can be made therein without departing from the scope of the invention.

What we claim is:

1. In a coffee brewing machine, a continuous flow type heat exchanger comprising:
   a pair of plates having good heat conducting properties fastened one to the other one of said plates having a plurality of grooves formed therein;
   a serpentine shaped tube positioned in some of said grooves and sandwiched between said plates for the passage of water through said pair of plates;
   and heating means comprising electrical heaters positioned in other of said grooves and sandwiched between said plates for transferring heat from said heating means to heat said plates, said tube and the water flowing therethrough.

2. In a coffee brewing machine, a continuous flow type heat exchanger comprising:
   a pair of mirror image plates having a plurality of grooves formed therein and comprised of material having good heat conducting properties and fastened one to the other;
   a serpentine shaped tube positioned in some of said grooves for the passage of water through said pair of plates;
   and heating means comprising electrical heaters positioned in others of said grooves for transferring heat from said heating means to heat said plates, said tube, and the water flowing therethrough.

3. In a coffee brewing machine, a continuous flow type heat exchanger comprising:
   a pair of mirror image plates having a plurality of grooves formed therein and comprised of material having good heat conducting properties and fastened one to the other;
   a serpentine shaped tube positioned in some of said grooves for the passage of water through said pair of plates;
   and heating means comprised of elongated heating elements positioned in at least two of said grooves;
   the grooves within which said heating elements are disposed being spaced from each other a sufficient distance to permit the positioning of the serpentine tube in said other grooves;
   whereby the heat from said heating elements will heat said plates, said tube, and the water flowing therethrough.

4. In a coffee brewing machine, a continuous flow type heat exchanger comprising:
   a pair of mirror image plates having a plurality of matching semi-circular and aligned grooves formed therein and comprised of material having good heat conducting properties and securely but releasably fastened one to the other;

said matched grooves forming a plurality of circular passages when said plates are fastened one to the other;

a serpentine shaped tube having a plurality of parallel portions and arcuate connecting portions interconnecting said parallel portions and the parallel portions positioned in some of said circular passages for the passage of water through said pair of plates;

and heating means comprised of elongated electrical heating elements positioned in the two outermost circular passages formed by said plates;

whereby the heat from said heating means will heat said plates, said tube and the water flowing therethrough.

5. In an automatic coffee making machine wherein water is heated and passed through a spray nozzle onto provided coffee grounds and through the coffee grounds into a provided container:

the combination with said coffee making machine of means for heating said water in a heat exchanger as the water flows continuously through the heat exchanger;

said means for heating the water comprising;

a pair of mirror image plates having a plurality of grooves formed therein and comprised of material of good heat conducting properties and securely but releasably fastened one to the other;

a serpentine shaped tube positioned in some of said grooves for the flow of water through said plates; and electrical heaters positioned in others of said grooves for transferring heat from said electrical heaters to said plates to heat said tube and the water flowing therethrough.

6. In an automatic coffee making machine wherein water is heated and passed through a spray nozzle onto provided coffee grounds and through said coffee grounds into a provided container the combination with said coffee making machine of:

means for heating water in a heat exchanger as the water flows continuously through the heat exchanger;

said means for heating water comprising:

a pair of mirror image plates having a plurality of matched semi-circular grooves formed therein and comprised of material of good heat conducting properties and securely but releasably fastened one to the other;

said matched grooves forming a plurality of circular grooves when said plates are fastened one to the other;

a serpentine shaped tube having a plurality of parallel portions and arcuate connecting portions interconnecting said parallel portions and the parallel portions positioned in some of said grooves for the passage of water through said pair of plates; and heating means comprised of elongated heating elements positioned in the two outer circular grooves formed in said plates when in assembled position for transferring heat to said plates to heat said tube and the water flowing therethrough.

7. In an automatic coffee making machine, a hot water heating section vertically disposed and comprising:

a heat exchanger unit having a pair of metallic good heat conducting plates secured one to the other and having a serpentine shaped water line extending therethrough and having at least one electrical heater unit positioned between said pair of plates for heating water flowing through said serpentine shaped water line;

a solenoid operated valve connected to a source of water and to said water line and selectively operated to control the flow of water to said water line;

a brewing section secured to a wall of said water heating section and comprising:

a spray nozzle connected to the output of said hot water heating section;

a removably positioned coffee grounds container positioned below said spray nozzle so that water from said spray nozzle is directed to pass over and through said coffee grounds;

said coffee container also being provided with an exit passage through which the hot coffee may pass;

and a coffee collection and warmer section associated with said hot water heating section and below said brewing section for collecting the hot brewed coffee as it leaves said exit passage and comprises:

a removable and transparent decanter positioned below said exit passage for collecting the hot coffee passing therethrough;

a support for said decanter;

heating means positioned in said last-mentioned support for maintaining said hot coffee at a desired temperature;

and an electric eye assembly having its light beam directed through said transparent decanter and controlling said solenoid operated valve whereby the said valve will close;

stopping the flow of water through said heat exchanger unit;

when the level of collected coffee in said transparent decanter reaches a certain height.

8. In an automatic coffee making machine, a hot water heating section vertically disposed and comprising:

a heat exchanger unit having a pair of metallic good heat conducting plates secured one to the other and having a serpentine shaped water line extending therethrough and having at least one electrical heater unit positioned between said pair of plates for heating water flowing through said serpentine shaped water line;

a solenoid operated valve connected to a source of water and to said water line and selectively operated to control the flow of water to said water line;

a brewing section secured to a wall of said water heating section and comprising:

a spray nozzle connected to the output of said hot water heating section;

a removably positioned coffee grounds container positioned below said spray nozzle whereby water from said spray nozzle is readily delivered to said coffee grounds;

said coffee container having a removable and disposable filter positioned to receive said coffee ground;

said filter positioned on a wire mesh spacer element for spacing said filter from the bottom of said coffee grounds container;

said coffee container also being provided with an exit passage through which the hot coffee may pass;

and a coffee collection and warmer section associated with said hot water heating section and below said brewing section for collecting the hot brewed coffee as it leaves said exit passage and comprises:

a removable and transparent decanter positioned below said exit passage for collecting the hot coffee passing therethrough;

a support for said decanter;

heating means positioned in said last-mentioned support for maintaining said hot coffee at a desired temperature;

and an electric eye assembly having its light beam directed through said transparent decanter and controlling said solenoid operated valve whereby the said valve will close;

stopping the flow of water through said heat exchanger unit;

when the level of collected coffee in said transparent decanter reaches a certain height.

9. An electrical control system for controlling the operation of an automatic coffee making machine having a hot water heating section for heating water from a water source;
  a brewing section where hot water is dispensed over positioned coffee grounds;
  and a coffee collection section where the hot coffee is collected and wherein said hot water heating section comprises a heat exchanger unit having a pair of good heat conducting plates secured one to the other;
  a serpentine shaped water line extending between said plates and electrical heater means positioned between said plates;
  and wherein said coffee collection section comprises a removable and transparent decanter positioned below said brewing section;
in combination with:
  a solenoid valve connected to a source of water and the inlet of said serpentine shaped water line and selectively operated to deliver water to said heat exchanger unit;
  a first relay means energized responsive to the manual manipulation of a normally open first switch for actuating said solenoid valve;
  a second relay means energized responsive to the energization of said first relay means and providing a lock-in circuit for said first relay means;
  a manually manipulated second normally closed switch for de-energizing said first relay means and said second relay means to de-energize said solenoid valve;
  an electric eye assembly comprising a photocell and an aligned lamp;
  said lamp being energized responsive to the energization of said first relay means and sending a beam of light through said transparent decanter onto said photocell;
  said photocell being in series with said second relay means and selected so as to have a voltage drop thereacross sufficient to prevent the energization of said second relay means when said beam is interrupted and not sufficient to prevent the energization of said second relay means when said beam is directed onto said photocell whereby the level of the hot coffee in said decanter controls the flow of hot water to the coffee brewing section;
  and a thermostat adapted to sense the temperature of the heat exchanger unit and positioned in series with said electrical heater means and adapted to maintain a substantially constant temperature for said heat exchanger unit.

References Cited by the Examiner

UNITED STATES PATENTS

| | | |
|---|---|---|
| 2,114,063 | 4/1938 | Stoner. |
| 2,232,998 | 2/1941 | Cernohouz. |
| 2,502,844 | 4/1950 | Hildreth _____ 99—282 |
| 2,606,297 | 8/1952 | Sweet _____ 250—218 |
| 2,764,178 | 9/1956 | Paul et al. _____ 250—218 X |
| 2,859,945 | 11/1958 | Kleist _____ 165—64 X |
| 3,010,091 | 11/1961 | Sawyer. |

FOREIGN PATENTS

| | | |
|---|---|---|
| 861,193 | 2/1961 | Great Britain. |

WALTER A. SCHEEL, *Primary Examiner.*

S. P. FISHER, *Assistant Examiner.*